(12) United States Patent
Ganzer

(10) Patent No.: US 8,936,178 B2
(45) Date of Patent: Jan. 20, 2015

(54) ADHESIVE MELTER HAVING QUICK CHANGE PUMP PACK ASSEMBLY AND ASSOCIATED METHODS

(71) Applicant: Nordson Corporation, Westlake, OH (US)

(72) Inventor: Charles P. Ganzer, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 163 days.

(21) Appl. No.: 13/688,966

(22) Filed: Nov. 29, 2012

(65) Prior Publication Data
US 2014/0144942 A1 May 29, 2014

(51) Int. Cl.
| | |
|---|---|
| *B67D 7/82* | (2010.01) |
| *B23P 11/00* | (2006.01) |
| *B67D 7/62* | (2010.01) |
| *B05C 11/10* | (2006.01) |
| *F16L 37/00* | (2006.01) |
| *F01C 21/00* | (2006.01) |
| *F04C 13/00* | (2006.01) |
| *F04B 17/06* | (2006.01) |
| *F04B 35/06* | (2006.01) |
| *F04C 15/00* | (2006.01) |

(52) U.S. Cl.
CPC . *B67D 7/82* (2013.01); *B23P 11/00* (2013.01); *B67D 7/62* (2013.01); *B05C 11/10* (2013.01); *B05C 11/1042* (2013.01); *F16L 37/00* (2013.01); *F01C 21/007* (2013.01); *F04C 13/00* (2013.01); *F04B 17/06* (2013.01); *F04B 35/06* (2013.01); *F04C 15/0057* (2013.01)
USPC .......................... 222/146.2; 222/173; 222/333

(58) Field of Classification Search
CPC .... B05C 11/1042; B05C 5/001; B29B 13/022
USPC ........... 222/146.5, 593, 173, 146.2, 333, 325, 222/410; 29/428
See application file for complete search history.

(56) References Cited

U.S. PATENT DOCUMENTS

| | | | | |
|---|---|---|---|---|
| 4,811,863 | A * | 3/1989 | Claassen ..................... | 222/146.5 |
| 5,699,938 | A * | 12/1997 | Siddiqui et al. ............ | 222/146.5 |
| 7,021,504 | B2 * | 4/2006 | Dittmann et al. ............. | 222/333 |
| 2004/0099752 | A1 * | 5/2004 | Boger ........................... | 239/548 |

* cited by examiner

*Primary Examiner* — Kevin P Shaver
*Assistant Examiner* — Robert Nichols, II
(74) *Attorney, Agent, or Firm* — Wood, Herron & Evans, L.L.P.

(57) ABSTRACT

An adhesive melter includes a melter support frame with a spring-loaded support and a manifold for receiving molten adhesive. The melter also includes a pump pack assembly having a rigid frame carrying a pump for directing flow of molten adhesive through the manifold, a motor, and a drive coupling operatively connecting the pump and motor. The pump pack assembly is collectively mounted as a unit on the melter support frame by positioning the rigid frame on the spring-loaded support, moving the pump into abutment with the manifold, and fastening the pump into fluid-tight engagement with the manifold, the support adjusting in position during fastening to assist with carrying the pump pack assembly as a cantilever load.

10 Claims, 8 Drawing Sheets

ADHESIVE MELTER HAVING QUICK CHANGE PUMP PACK ASSEMBLY AND ASSOCIATED METHODS

FIELD OF THE INVENTION

The present invention generally relates to an adhesive melter used with an adhesive dispensing system and, more particularly, to a pump pack assembly used with the adhesive melter.

BACKGROUND

A conventional dispensing system for supplying heated adhesive (i.e., a hot-melt adhesive dispensing system) generally includes a melter configured to receive adhesive in solid or semi-solid form and then heat and/or melt the adhesive, a pump in communication with the melter for driving and controlling the dispensation of the heated adhesive out of the melter, and one or more adhesive dispensing devices (e.g., guns or modules) receiving the heated adhesive from the pump. One or more hoses or manifolds may also be included in the dispensing system to direct the heated adhesive between the melter, pump, and dispensing devices. One particular type of melter used with conventional dispensing systems is a tank melter which includes a relatively large tank for storing molten adhesive that is to be delivered as needed by the dispensing devices. The tank delivers molten adhesive into a manifold located adjacent to the tank, and the pump is generally connected to this manifold to control flow of adhesive at a location immediately downstream from the tank. In order to allow for maintenance of the pump, should such maintenance become necessary, the pump is typically directly connected with bolt fasteners or a similar method to a wall of the manifold.

In embodiments where the pump is mechanically actuated, like a gear pump, a motor must be operatively coupled to the pump for driving the pump. The motor should be shielded from the heat energy applied by the molten adhesive to the pump. As a result, the motor is separately coupled to a frame of the melter and a drive coupling is positioned between the motor and pump to deliver driving rotations of the motor to the pump. In addition to acting as a thermal barrier between the motor and pump, the drive coupling is designed to compensate for shaft misalignment of the motor and pump. This drive coupling must be able to correct for perpendicularity errors caused by the tolerance and separate mounting of the motor and the pump, as well as axial and angular misalignments. Therefore, the drive coupling that must be used with the pump and motor is expensive and complex to install correctly.

During operation of the adhesive dispensing system, if a fault is detected within the pump, maintenance personnel have to disassemble the drive coupling and remove the motor from the melter frame before access is provided to work on the pump. Then after the pump is fixed or replaced, the complex installation and adjustment of the motor and the drive coupling must be repeated again before the adhesive dispensing system can operate. Each of these disassembly and assembly steps add significant time to the downtime required to repair or replace the pump. Furthermore, the assembly of the drive coupling must be done carefully to avoid further downtime for adjustments to alignment between the motor and pump. On the whole, a routine maintenance of the pump may cause a downtime of as much as an hour. In certain dispensing fields such as nonwoven article manufacturing where the adhesive dispensing system produces up to $10,000 worth of product per minute, a significant downtime for maintenance can be financially significant. Thus, any unnecessary downtime of the adhesive dispensing system should be minimized or eliminated.

For reasons such as these, an improved assembly and process for mounting a pump, motor, and drive coupling onto an adhesive melter of a dispensing system would be desirable.

SUMMARY OF THE INVENTION

According to one embodiment of the invention, an adhesive melter for use in an adhesive dispensing system includes a melter support frame with a spring-loaded support. The adhesive melter also includes a melter tank and a manifold positioned on the melter support frame, the manifold being configured to receive molten adhesive from the melter tank. A pump pack assembly is also included in the melter, the pump pack assembly having a rigid frame, a pump, a motor, and a drive coupling. The rigid frame includes a base, a pump support member, a rear support member, and at least one fastener connected to the manifold. The pump support member and the rear support member are coupled to the base of the rigid frame. The pump is coupled to the pump support member, and the motor is coupled to the rear support member. The drive coupling operatively connects the pump to the motor. The pump pack assembly is collectively mounted as a unit on the melter support frame by positioning the rigid frame on the spring-loaded support, the pump support member being positioned in fluid-tight engagement with the manifold accommodating the flow of molten adhesive between the pump and manifold. The spring-loaded support assists with resiliently carrying the pump pack assembly at the base as a cantilever load. Therefore, the pump and motor may be quickly connected and disconnected as a unit when maintenance is required without significantly impacting the operational uptime of the adhesive dispensing system.

The spring-loaded support carries a majority of the cantilever load defined by the pump pack assembly so that the at least one fastener is not damaged by the cantilever load. The fastener may be the only item mechanically securing the pump pack assembly to the melter support frame such that removal of the pump pack assembly can be done by merely loosening the fastener and lifting the rigid frame off of the spring-loaded support. The melter and pump pack assembly may also include a quick change receptacle and a corresponding quick change plug for providing power and control signals to the pump and the motor. A handle may also be provided on the rigid frame to help an operator move the pump pack assembly into and out of engagement with the spring-loaded support.

In another aspect, the melter support frame includes a guide rail positioned adjacent to the spring-loaded support, and the pump pack assembly includes a guide track formed in the base of the rigid frame. The guide track receives the guide rail when the pump pack assembly is positioned on the spring-loaded support so as to accurately position the pump pack assembly relative to the manifold. The spring-loaded support may include a U-shaped support arm that projects around the guide rail so that the guide track and the guide rail normally define a gap between the pump pack assembly and the melter support frame. Consequently, the pump pack assembly is only rigidly connected to the adhesive melter at the manifold to avoid the influence of perpendicularity error from affecting the fluid-tight engagement of the pump and the manifold. Additional alignment features may also be provided such as a pair of alignment slots on the manifold and an alignment fork projecting forwardly from the base of the rigid frame. The alignment fork is configured to engage the alignment slots to ensure accurate lateral positioning of the pump pack assembly when the pump support member is pushed into abutment with the manifold.

In yet another aspect, the pump support member and the rear support member each include a plate extending upwardly from the base. The pump pack assembly may further include a tie rod extending between the pump support member and the rear support member and spaced from the base. The tie rod ensures that the plates of the two support members are aligned in generally parallel relation. The at least one fastener may include a plurality of coupling bolts held captive on the rigid frame and extending between the pump support member and the rear support member. The pump, motor, and drive coupling may therefore be connected and removed from the adhesive melter quickly and easily to save significant downtime that would be experienced otherwise as a result of performing maintenance on these components.

In another embodiment of the invention, a method of coupling a pump pack assembly to a manifold on an adhesive melter includes placing a rigid frame of the pump pack assembly onto a spring-loaded support of the melter. The spring-loaded support therefore carries the weight of the pump pack assembly as a cantilever load. The method also includes moving the pump pack assembly toward the manifold so that a pump support member of the pump pack assembly abuts the manifold. The pump support member is then fastened into fluid-tight engagement with the manifold. As a result, flow of molten adhesive is accommodated between a pump of the pump pack assembly and the manifold.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

FIG. 8A is an expanded detail view of the perpendicularity error located between the pump support member and the manifold in FIG. 8 (shown as encircled area 8A in FIG. 8).

DETAILED DESCRIPTION OF THE ILLUSTRATIVE EMBODIMENTS

Figure 1:
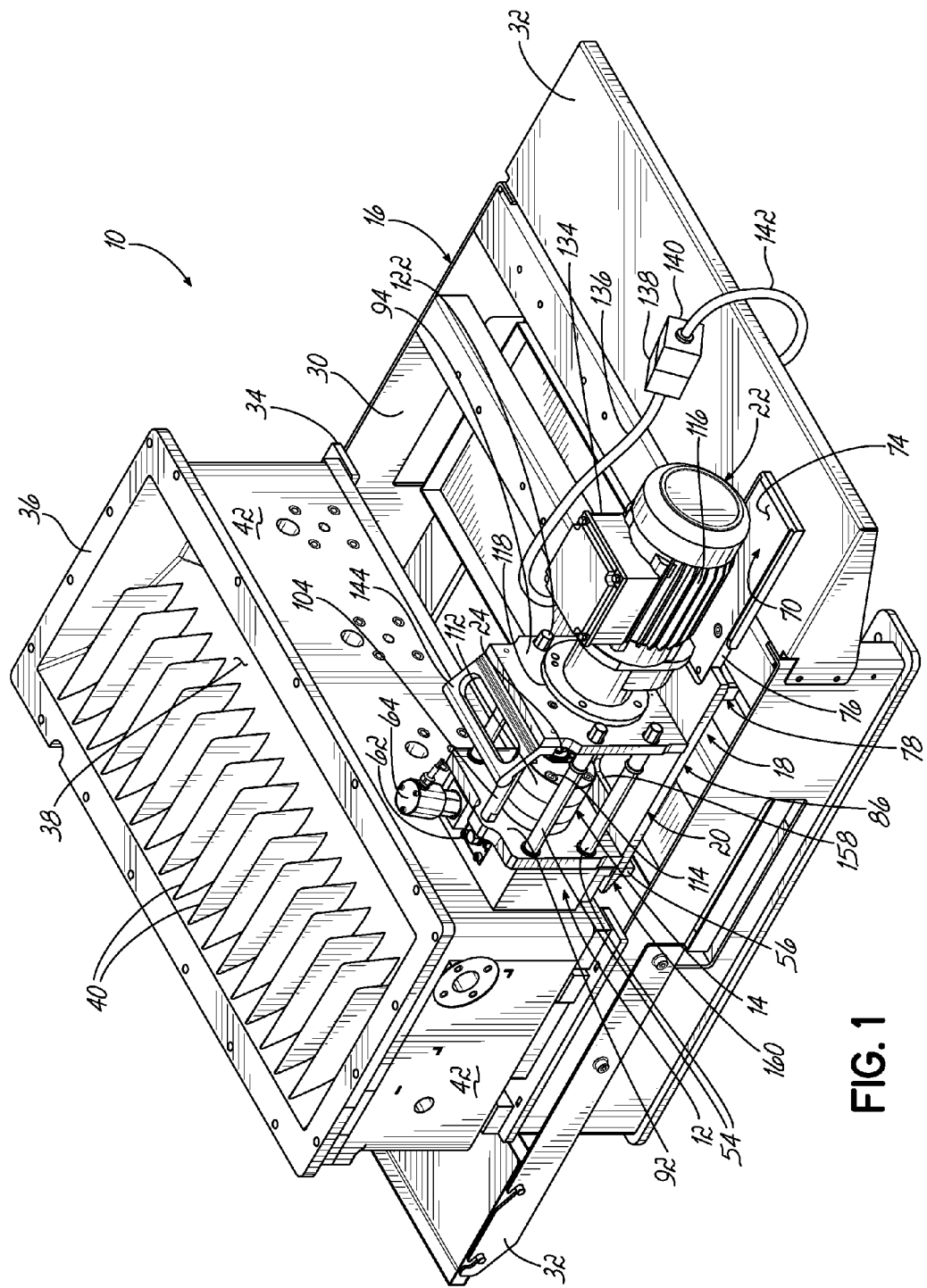
FIG. 1 is a top perspective view of an adhesive melter according to an exemplary embodiment of the current invention, the adhesive melter including a quick change pump pack assembly installed at a manifold on the melter.

Referring to FIGS. 1 through 9, an adhesive melter 10 in accordance with an exemplary embodiment of the invention is shown. The adhesive melter 10 is a large tank-type melter 10 configured to melt large amounts of adhesive and supply that adhesive via a manifold 12 and a pump 14 to one or more dispensing devices (not shown) located downstream from the adhesive melter 10. The adhesive melter 10 of the exemplary embodiment includes much of the same structure contained in VersaBlue® melters commercially available from Nordson Corporation of Westlake, Ohio. However, the adhesive melter 10 differs from the known melters in that a quick change pump system and method are used with the adhesive melter 10.

More particularly, the adhesive melter 10 includes structure on a melter support frame 16 and on the manifold 12 configured to receive a pump pack assembly 18. The pump pack assembly 18 includes a rigid frame 20 carrying the pump 14, a motor 22, and a drive coupling 24 operatively connecting the pump 14 and motor 22. The pump 14 and the motor 22 are pre-aligned with one another on the rigid frame 20 so that an inexpensive and less complex drive coupling 24 can be used with the pump pack assembly 18. Advantageously, the pump pack assembly 18 may be mounted as a unit onto the adhesive melter 10 so that the pump 14, motor 22, and drive coupling 24 are simultaneously installed or removed when required for maintenance. As a result, the pump 14 can be replaced in a few minutes rather than requiring downtime for the adhesive melter 10 of up to an hour whenever repairs or replacement of a component is required. In this regard, the quick change system and method enabled by the pump pack assembly 18 improves the operation and reduces the cost and complexity of the adhesive melter 10.

Figure 2:
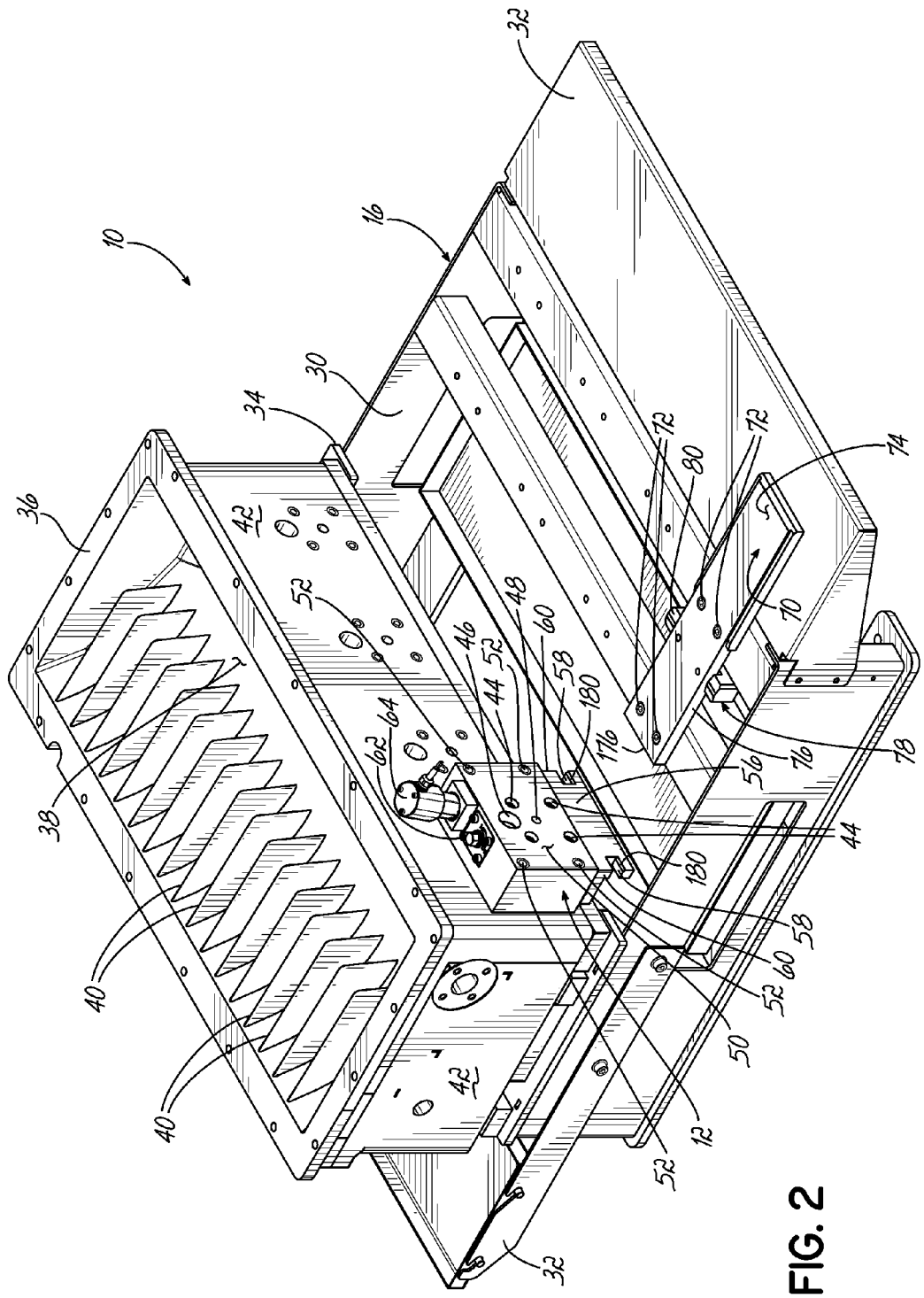
FIG. 2 is a top perspective view of the adhesive melter of FIG. 1, with the pump pack assembly removed to illustrate further details of a melter support frame and the manifold.

With particular reference to FIGS. 1 and 2, the exemplary embodiment of the adhesive melter 10 is shown in further detail. To this end, the adhesive melter 10 includes the melter support frame 16, which includes a central frame portion 30 and extensions 32 coupled to the central frame portion 30 to collectively define a support surface 34 facing upwardly from the melter support frame 16. The adhesive melter 10 also includes a melter tank 36 mounted on the support surface 34 and defining an interior 38 configured to receive adhesive material to be melted and heated to a desired application temperature. A top wall of the melter tank 36 is not shown in FIG. 1 such that the interior 38 and heater grid partitions 40 are visible within the interior 38; however, it will be understood that the melter tank 36 may be provided with different shapes and interior configurations in other embodiments in accordance with the current invention. The interior 38 of the melter tank 36 is bounded by a plurality of sidewalls 42 forming a generally rectangular shape in the exemplary embodiment of the adhesive melter 10. Along one of these sidewalls 42, the manifold 12 is connected to the melter tank 36 so that the manifold 12 is placed in fluid communication with the interior 38 of the melter tank 36. The connection of the manifold 12 to the sidewall 42 may be performed by a plurality of fasteners 44 as shown in FIG. 2.

The manifold 12 defines internal passages (not shown) extending from the interior 38 of the melter tank 36 to a manifold outlet 46 and also extending from a manifold inlet 48 to outlet conduits or passages (not shown) that lead to one or more dispensing devices connected to the adhesive melter 10. These dispensing devices may include any type of adhesive dispensing module or gun, for example, depending on the particular dispensing process being fed by the adhesive melter 10. The manifold outlet 46 and the manifold inlet 48 are each located in a connection surface 50 of the manifold 12 that faces away from the melter tank 36. As described in further detail below, the connection surface 50 is positioned to come into fluid-tight engagement with the pump pack assembly 18 such that the pump 14 communicates with the manifold 12 at the manifold outlet 46 and the manifold inlet 48. The connection surface 50 also includes a plurality of threaded apertures 52 configured to receive coupling bolts 54 located on the pump pack assembly 18 to connect the manifold 12 to the pump pack assembly 18 as described below. With the exception of a single cord electrical connection described below, these coupling bolts 54 are the only fasteners between the pump pack assembly 18 and the remainder of the adhesive melter 10 that must be disconnected or uncoupled to remove or replace the pump pack assembly 18. Thus, the coupling bolts 54 provide a quick mechanism for securing and detaching the pump pack assembly 18 to the manifold 12. It will be understood that the coupling bolts 54 may be replaced with at least one fastener having a different configuration in other embodiments of the invention, such as a clamping device coupled to the rigid frame 20 or non-threaded types of fasteners.

With reference to FIG. 2, additional elements of the manifold 12 are shown in further detail. The manifold 12 includes an extension plate 56 coupled to the remainder of the manifold 12 and extending downwardly from the connection surface 50. The extension plate 56 includes a pair of alignment slots 58 formed on opposing sides 60 of the extension plate 56. The alignment slots 58 are used to guide corresponding structure projecting from the pump pack assembly 18 as the pump pack assembly 18 is moved into engagement with the manifold 12, thereby ensuring accurate placement of the pump pack assembly 18 relative to the connection surface 50. It will be understood that the manifold 12 may alternatively be increased in size so as to include these alignment slots 58 without the provision of a separate extension plate 56 in other embodiments of the invention. The manifold 12 also contains additional known structures and/or sensors to control and monitor flow of molten adhesive through the manifold 12, such as the tank isolation valve 62 and the hydraulic pressure relief valve 64 shown in FIG. 2. In the example of the tank isolation valve 62, the communication between the melter tank 36 and the pump 14 may be cut off at the tank isolation valve 62 when the pump pack assembly 18 is to be removed, thereby avoiding the loss of adhesive material through the manifold outlet 46 until the pump pack assembly 18 is reconnected to the manifold 12. Consequently, the manifold 12 is configured for connection and disconnection to the pump pack assembly 18 as needed during operation of the adhesive melter 10.

FIG. 2 also illustrates that the melter support frame 16 includes a guide rail 70 mounted on the support surface 34. The guide rail 70 is a generally rectangular elongate bar coupled to the melter support frame 16 with threaded fasteners 72. The guide rail 70 includes a top surface 74 configured to face towards the pump pack assembly 18 during connection of the pump pack assembly 18 to the manifold 12 and longitudinal side surfaces 76 configured to guide corresponding structure on the pump pack assembly 18 as described below. At an intermediate portion of the guide rail 70, a spring-loaded support 78 projects upwardly from the melter support frame 16. More specifically, the spring-loaded support 78 includes a U-shaped support arm 80 (may also be referred to as a block) that extends from below the guide rail 70 to a height immediately below the top surface 74 of the guide rail 70 along both longitudinal side surfaces 76. To this end, the U-shaped support arm 80 is positioned to engage the pump pack assembly 18 as the pump pack assembly 18 is guided along the guide rail 70. Further details and the operation of the spring-loaded support 78 are provided with reference to FIGS. 5 through 9 below.

Figure 3:
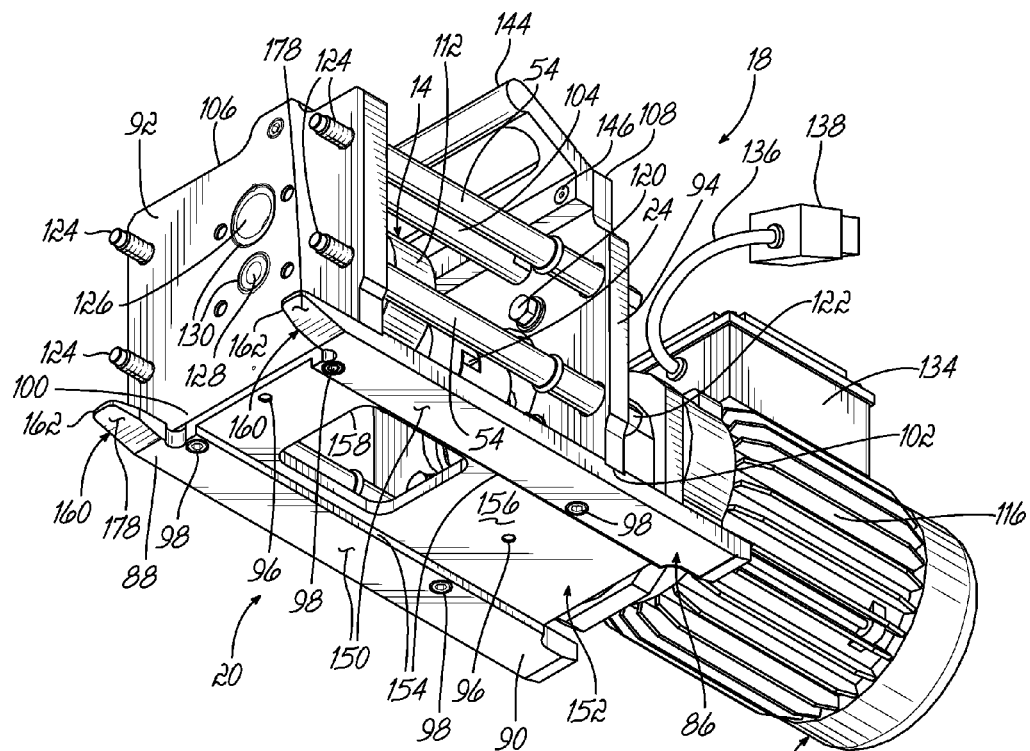
FIG. 3 is a bottom perspective view of the pump pack assembly of FIG. 1, revealing a guide track formed by a rigid frame of the pump pack assembly.
Figure 4:
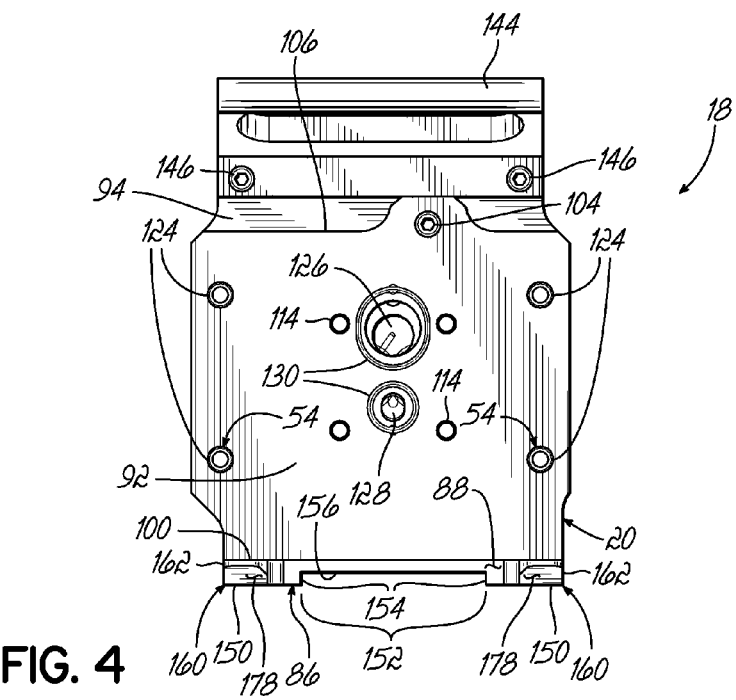
FIG. 4 is an elevational front end view of the pump pack assembly of FIG. 3.
Figure 5:
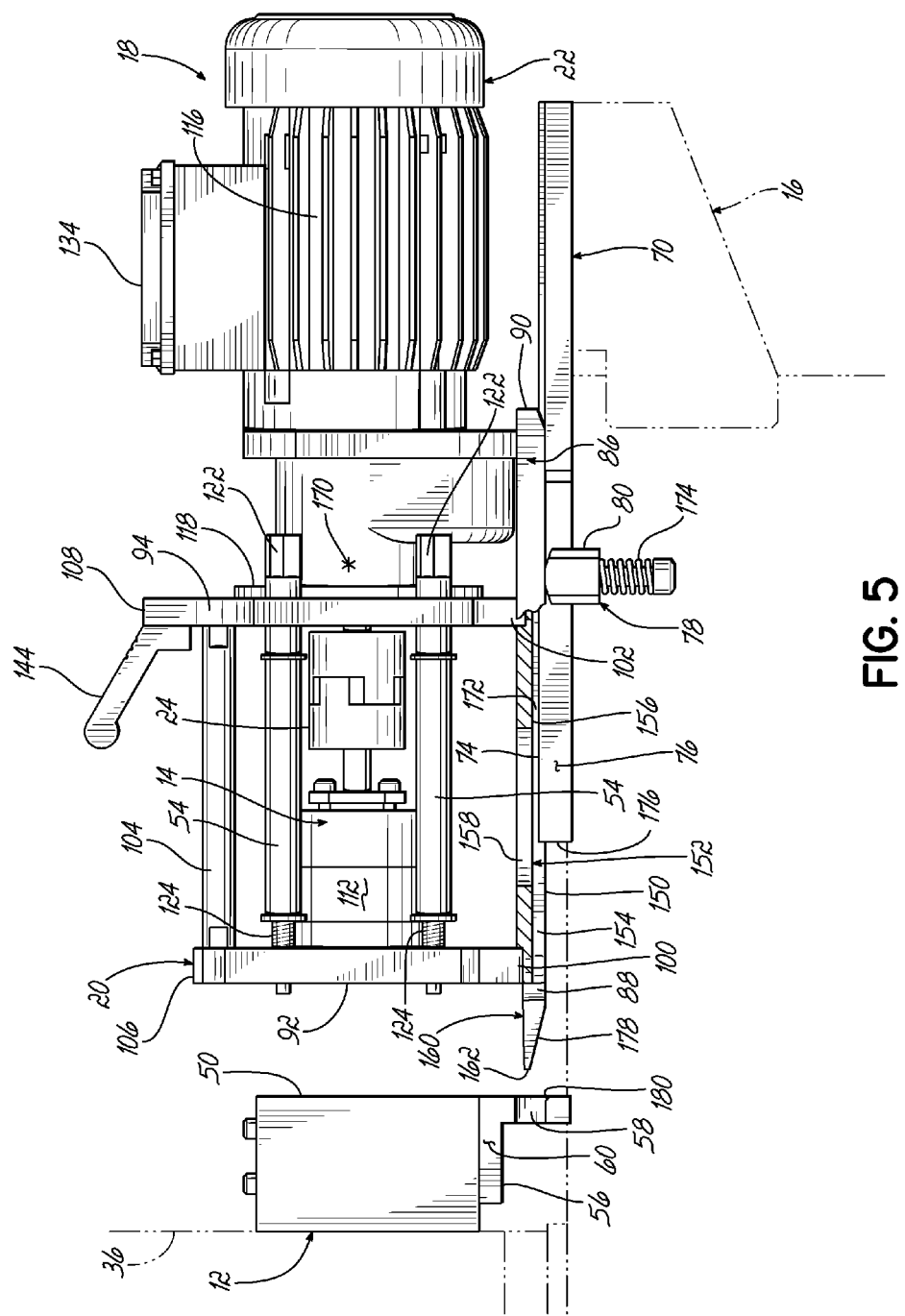
FIG. 5 is a side view of the adhesive melter and pump pack assembly of FIG. 1 during a first installation step in which the rigid frame of the pump pack assembly has been positioned on a spring-loaded support, the side view partially cut away to reveal engagement of a guide track on the rigid frame with a guide rail on the melter support frame.

With reference to FIGS. 3 and 4, the pump pack assembly 18 of the exemplary embodiment is shown in further detail. As briefly described above, the pump pack assembly 18 includes a rigid frame 20 carrying the pump 14, the motor 22, and the drive coupling 24 connecting the pump 14 and motor 22. The rigid frame 20 is defined by three support members that are fixedly coupled to each other to define structural mounting locations for the pump 14 and the motor 22. More specifically, the rigid frame 20 includes a base 86 that extends along a longitudinal direction of the pump pack assembly 18 between a front end 88 and a rear end 90, a pump support member 92 coupled to the base 86 proximate to the front end 88 of the base 86, and a rear support member 94 coupled to the base 86 towards the rear end 90 of the base 86. Each of the pump support member 92 and the rear support member 94 are aligned with the base 86 by a dowel pin 96 and fastened to the base 86 by threaded fasteners 98 located on either side of the dowel pin 96. The dowel pin 96 and threaded fasteners 98 engage with a bottom end 100 of the pump support member 92 and a bottom end 102 of the rear support member 94.

As shown in the exemplary embodiment, the pump support member 92 and the rear support member 94 include plates that are oriented generally parallel to one another and perpendicular to the base 86, although the support members 92, 94 may be repositioned to different orientations to match different mounting structures of the pump 14 and motor 22 in other embodiments. Furthermore, the pump support member 92 and the rear support member 94 may define non-plate shaped structures in other embodiments of the pump pack assembly 18 without departing from the scope of the invention. The support members 86, 92, 94 are typically formed from a rigid structural steel or aluminum, but other materials may be used without departing from the scope of the invention. In order to keep the pump support member 92 and the rear support member 94 generally parallel to one another in the exemplary embodiment, a tie rod 104 may be coupled to the top end 106 of the pump support member 92 and the top end 108 of the rear support member 94. The collective structure defined by the support members 86, 92, 94 and the tie rod 104 provides rigid and reliable support for the components supported on the pump pack assembly 18. The tie rod 104 ensures the accurate and generally parallel alignment of the pump support member 92 and the rear support member 94. Alternative methods of aligning and coupling the support members 86, 92, 94 may be used in other embodiments without departing from the scope of the invention.

The connections between the driving components of the pump pack assembly 18 and the rigid frame 20 are shown in further detail in the perspective views of FIGS. 1 and 3. To this end, the pump 14 includes a pump housing 112 containing fluid passages and fluid pumping elements (not shown), the pump housing 112 being fixed in position to the pump support member 92 by a plurality of fasteners 114. Accordingly, when the pump support member 92 of the pump pack assembly 18 is brought into abutting engagement with the manifold 12, the pump 14 is moved into operative engagement with the remainder of the adhesive melter 10. In a similar manner, the motor 22 includes a motor housing 116 enclosing drive components, such as a drive shaft, and including a mounting flange 118 located in abutting engagement with the rear support member 94. The mounting flange 118 is fixed to the rear support member 94 by a plurality of fasteners 120. Therefore, even though the motor 22 and motor housing 116 extend rearward from the rear support member 94 beyond the rear end 90 of the base 86, the motor 22 remains fixed in position relative to the pump 14 fixed to the pump support member 92. Consequently, the drive coupling 24 inserted between the drive shaft (not shown) of the motor 22 and the drive components of the pump 14 does not need to be designed to adjust for axial misalignments or tolerance errors between the motor 22 and pump 14 connected in predictable and repeatable axial positions relative to each other. This lack of a requirement for axial misalignment adjustment enables the use of a less complex and less expensive drive coupling 24, which reduces the manufacturing cost of the pump pack assembly 18. It will be understood that when the pump 14 and the motor 22 are assembled onto the pump pack assembly 18, any radial misalignments of the pump 14 and the motor 22 may be adjusted for by enabling an adjustable positioning and fastening of the motor 22 to the rear support member 94, thereby avoiding the need for the drive coupling 24 to correct for such radial misalignments.

In addition to the tie rod 104, the pump pack assembly 18 also includes at least one fastener in the form of four coupling bolts 54, which extend between the pump support member 92 and the rear support member 94. The coupling bolts 54 are captive onboard fasteners having a head end 122 facing towards the motor 22 from the rear support member 94 and a threaded end 124 projecting forwardly from the pump support member 92. Furthermore, the coupling bolts 54 are used to engage with the threaded apertures 52 at the connection surface 50 of the manifold 12 when the pump pack assembly 18 is moved into abutment with the manifold 12 as described throughout this specification. The coupling bolts 54 remain in position on the rigid frame 20 when tightened or loosened from engagement with the manifold 12, which simplifies the number of separate parts that require attention and handling during assembly or disassembly of the pump pack assembly 18 with the manifold 12. As noted above, the pump pack assembly 18 may include at least one fastener having a different form than the coupling bolts 54 in other embodiments without departing from the scope of the invention.

Additionally, as shown in FIGS. 3 and 4, the pump support member 92 includes a pump inlet 126 configured to communicate with the manifold outlet 46 on the manifold 12 and also includes a pump outlet 128 configured to communicate with the manifold inlet 48 on the manifold 12. The pump inlet 126 and the pump outlet 128 may be surrounded by O-ring seals 130 (held captive within dovetail-style O-ring grooves, not shown) on the pump support member 92 as shown in the exemplary embodiment. In this regard, the engagement and tightening of the threaded ends 124 of the coupling bolts 54 into the threaded apertures 52 on the manifold 12 causes the pump inlet 126 and the pump outlet 128 to come into sealed abutment and communication with the manifold outlet 46 and the manifold inlet 48, respectively. As a result, the internal passages in the manifold 12 leading to the melter tank 36 and to outlet conduits are brought into communication with the pump 14 to complete the regular flow path for molten adhesive in the adhesive melter 10. As briefly described above, the rapid connection and disconnection of the pump pack assembly 18 and the manifold 12 with the coupling bolts 54 largely eliminates the time required to replace the pump 14 and the motor 22 on the adhesive melter 10, thereby reducing system downtime that can mean thousands of dollars in lost production in certain industries.

With continued reference to FIG. 3, the motor housing 116 includes a junction box 134 having a single combined power/control cord 136 extending to a quick connect plug 138. This quick connect plug 138 is configured to be connected to a quick connect receptacle 140 and cord 142 (shown in FIG. 1) that extends to a power source and a controller (not shown) included with the adhesive melter 10. Consequently, electrical power and control signals to drive the motor 22 and the operation of the pump 14 is delivered to the pump pack assembly 18 using only the single combined power/control cord 136. This arrangement further simplifies the replacement process for the pump 14 and motor 22 because the only steps required before moving the pump pack assembly 18 away from the manifold 12 are to loosen the coupling bolts 54 from engagement with the manifold 12 and to disconnect the quick connect plug 138 from the quick connect receptacle 140. It will be understood that the quick connect plug 138 and receptacle 140 may take any known electrical connector form and may be reversed so that the "receptacle" is on the single combined cord 136 and the "plug" is on the cord 142 in other embodiments consistent with the scope of the invention. Furthermore, the specific location on the pump pack assembly 18 where the single combined cord 136 and quick connect plug 138 are located may be modified according to the particular needs of the end user and to be most convenient for use during replacement of the pump pack assembly 18.

When completely assembled, as shown in FIG. 3, the pump pack assembly 18 may weigh over 40 pounds thanks to the size of the motor 22 and the rigid frame 20. Accordingly, the pump pack assembly 18 also includes a handle 144 coupled to the top end 108 of the rear support member 94. The handle 144 may be coupled to the rear support member 94 with fasteners 146 as shown. The positioning of the handle 144 at the rear support member 94 places the point of gripping for an operator generally above the center of gravity defined by the pump pack assembly 18, which is a convenient lifting point for the heavy load presented by the pump pack assembly 18. An operator can therefore easily move the pump pack assembly 18 by holding the handle 144 and moving the rigid frame 20 as required into or out of engagement with the manifold 12. Alternatively, the handle 144 may be repositioned or replaced by multiple handles in other embodiments of the pump pack assembly 18 without departing from the scope of the current invention.

With reference to FIGS. 3 and 4, the base 86 of the rigid frame 20 is shown in further detail. The base 86 includes a bottom surface 150 with a recessed portion defining a guide track 152 extending longitudinally between the front end 88 and the rear end 90. The guide track 152 is sized to receive the guide rail 70 located on the melter support frame 16 described in detail above. More specifically, the guide track 152 includes opposing sides 154 configured to engage to come into close proximity to the longitudinal side surfaces 76 of the guide rail 70 when the base 86 is placed onto the spring-loaded support 78. The guide track 152 also defines a facing surface 156 that may include one or more apertures 158 configured to face towards the top surface 74 of the guide rail 70 as shown in the assembly steps illustrated in FIGS. 5 through 9, discussed below. The base 86 also includes an alignment fork 160 defined by two projecting tines 162 extending forwardly at the front end 88 of the base 86. The alignment fork 160 is configured to engage with the alignment slots 58 located on the manifold 12 when moving the pump pack assembly 18 into engagement with the manifold 12, thereby properly aligning these elements for connection by the coupling bolts 54. It will be appreciated that the alignment fork 160 may be provided on the manifold 12 and the alignment slots 58 may be provided on the rigid frame 20 in other embodiments without departing from the scope of the invention. The operation of the alignment fork 160 and the alignment slots 58 is described in further detail below with reference to FIGS. 5 through 9.

Turning to FIGS. 5 through 9, the quick change connection process for mechanically connecting the pump pack assembly 18 to the manifold 12 is shown in stepwise fashion. In these Figures, a substantial portion of the base 86 is shown in a cutaway cross-section through the longitudinal center of the pump pack assembly 18 to reveal the spacing and/or engagement between the guide track 152 and the guide rail 70. In a first installation step shown in FIG. 5, the pump pack assembly 18 is moved as an entire unit with the handle 144 into position on the spring-loaded support 78 and the guide rail 70. More specifically, the pump pack assembly 18 is placed on the spring-loaded support 78 so that a center of gravity 170 defined by the pump pack assembly 18 is located generally above the spring-loaded support 78. As a result, the pump pack assembly 18 does not tend to tip in either direction (i.e., the base 86 is in a generally horizontal orientation), and the top surface 74 of the guide rail 70 remains spaced from the facing surface 156 of the guide track 152 by a small gap 172. In addition, the weight of the pump pack assembly 18 pushes the U-shaped support arm 80 of the support 78 downwardly to compress a spring 174 that biases the U-shaped support arm 80 upward into engagement with the guide rail 70 when not supporting the pump pack assembly 18. Although not shown explicitly in FIG. 5, the opposing sides 154 of the guide track 152 are positioned to engage or be close in proximity to the longitudinal side surfaces 76 of the guide rail 70, thereby properly orienting the pump pack assembly 18 laterally with respect to the manifold 12. Portions of the melter tank 36 and the melter support frame 16 are shown in phantom for environmental context in these views, although these structures shown in phantom do not directly take part in the connection process of the pump pack assembly 18.

Figure 6:
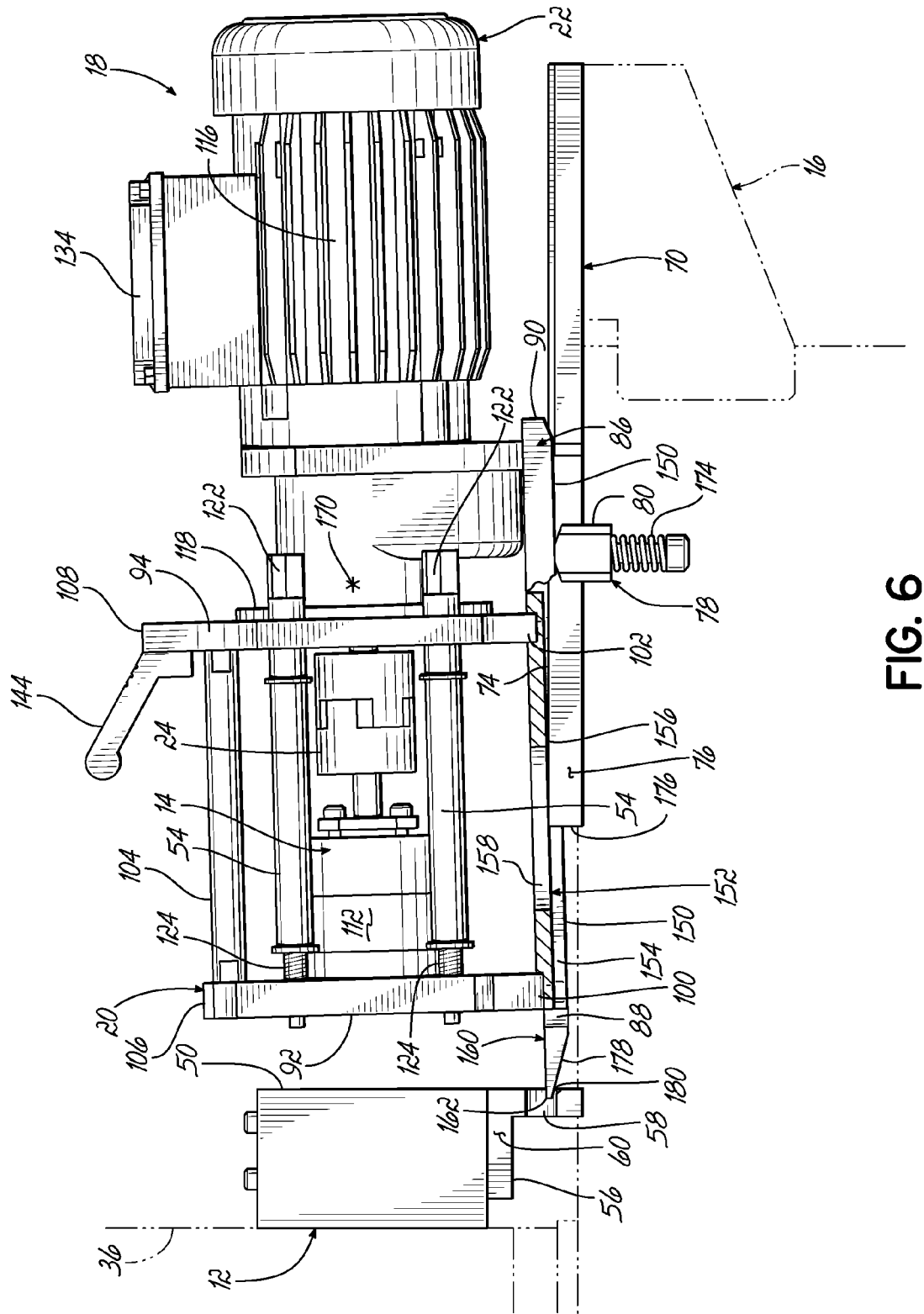
FIG. 6 is a side view of the adhesive melter and pump pack assembly of FIG. 5 during a second installation step in which the center of gravity of the pump pack assembly has moved beyond the spring-loaded support such that the guide track tips into abutment with the guide rail.

After placing the pump pack assembly 18 into engagement with the spring-loaded support 78, the operator may push the pump pack assembly 18 forward towards the manifold 12 as shown in the second installation step of FIG. 6. This forward movement is a sliding movement of the bottom surface 150 of the base 86 along the U-shaped support arm 80 that causes the center of gravity 170 to move past the spring-loaded support 78 such that the pump pack assembly 18 is caused to tip slightly downward at the pump support member 92 as shown in FIG. 6. This tipping movement causes the gap 172 between the guide track 152 and the guide rail 70 to close, which brings the facing surface 156 into engagement with the top surface 74 to stop further tipping movement of the pump pack assembly 18. Moreover, the aperture(s) 158 provided in the facing surface 156 may be positioned to receive a front end 176 of the guide rail 70 during this downward tipping movement.

Figure 7:
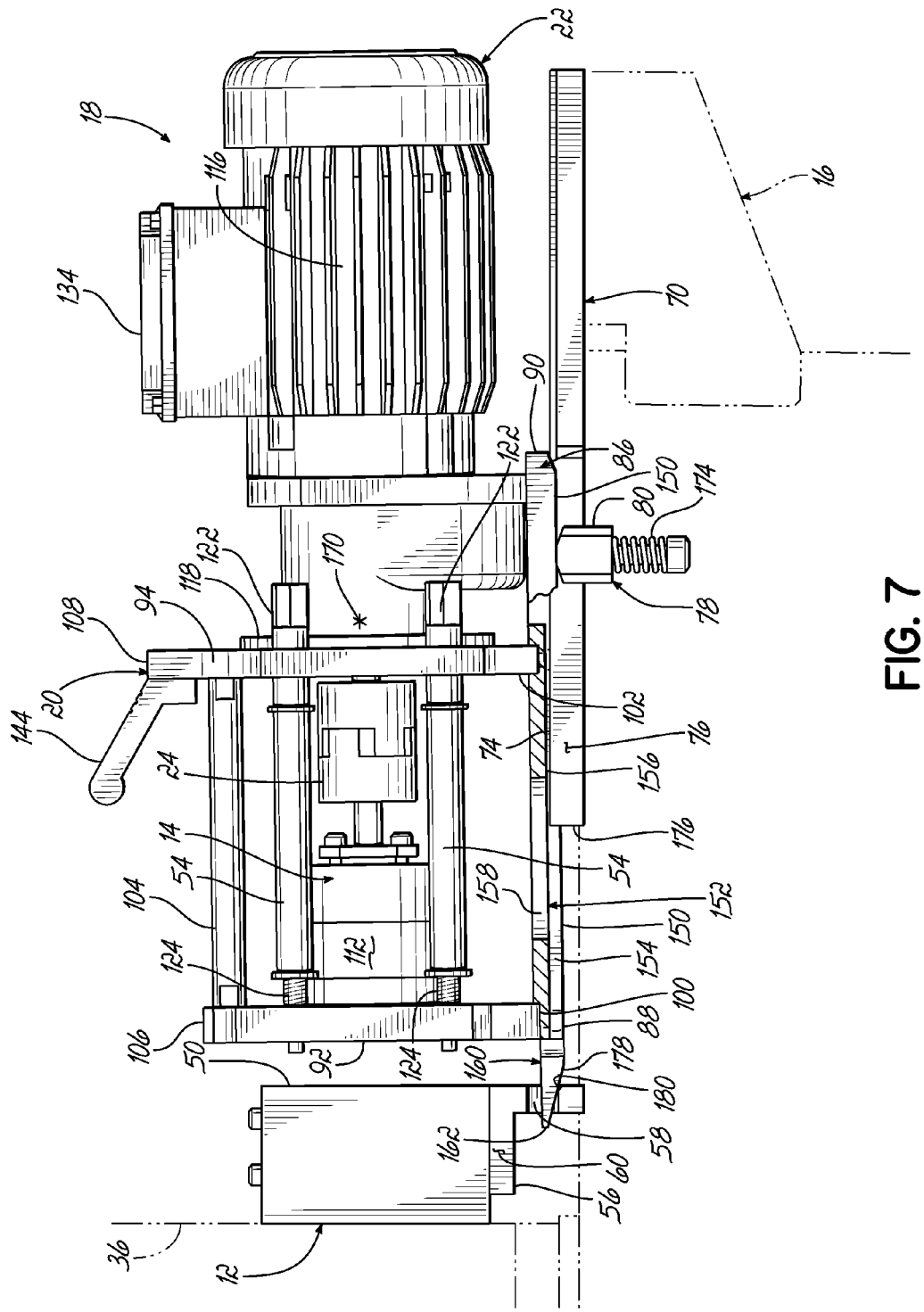
FIG. 7 is a side view of the adhesive melter and pump pack assembly of FIG. 6 during a third installation step in which an alignment fork on the pump pack assembly has engaged with alignment slots on the manifold to begin repositioning the pump pack assembly into a generally horizontal orientation adjacent to the manifold.

The tipping movement shown in FIG. 6 also brings a chamfered surface 178 on the alignment fork 160 into position to run into abutment with a rounded leading edge 180 provided on the alignment slots 58. Therefore, as the pump pack assembly 18 continues to be slid forward relative to the spring-loaded support 78, the alignment fork 160 and the alignment slots 58 engage with one another at the chamfered surface 178 and/or at the rounded leading edge 180 as shown in FIG. 7 during a third installation step. This engagement of the alignment fork 160 and the alignment slots 58 confirms the proper lateral positioning of the pump support member 92 relative to the manifold 12 and returns the pump pack assembly 18 to a generally horizontal orientation as the chamfered surface 178 slides upwardly to place the bottom of the alignment fork 160 (at bottom surface 150) into engagement with the alignment slots 58 during further forward sliding movement of the pump pack assembly 18. It will be understood that one or both of the chamfered surface 178 and the rounded leading edge 180 may be omitted in other embodiments of the adhesive melter 10.

Figure 8:
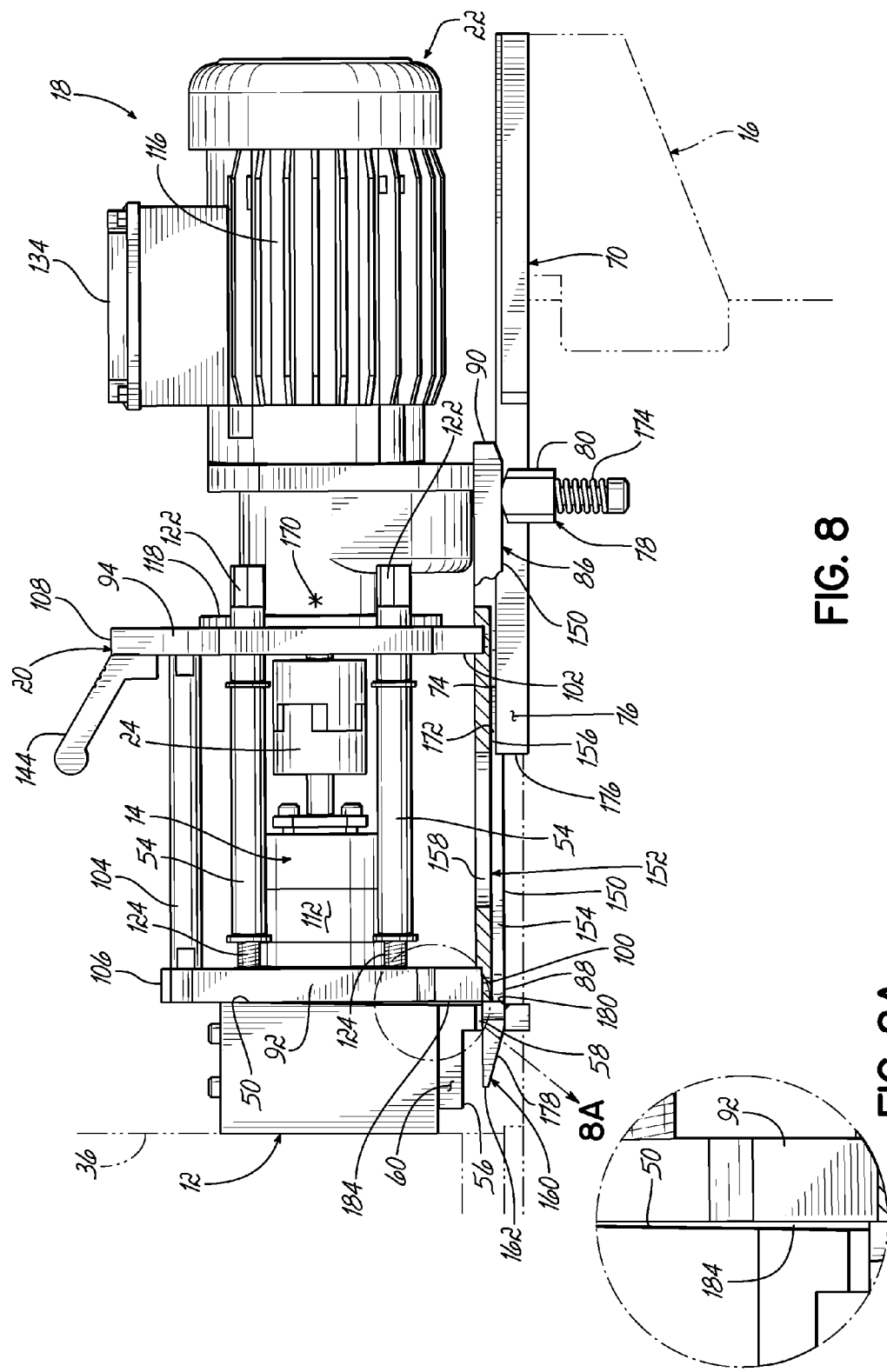
FIG. 8 is a side view of the adhesive melter and pump pack assembly of FIG. 7 during a fourth installation step in which a pump support member of the pump pack assembly has been pushed into abutting engagement with the manifold, a small perpendicularity error being revealed between these components.

The forward sliding movement of the pump pack assembly 18 is continued until the pump support member 92 comes into abutting engagement with the connection surface 50 of the manifold 12 as shown in the fourth installation step of FIG. 8. In this position, the alignment fork 160 is completely inserted into the alignment slots 58 as described above and the pump pack assembly 18 has been tipped or rotated back into a horizontal orientation such that the small gap 172 is provided again between the facing surface 156 on the guide track 152 and the top surface 74 of the guide rail 70. When pushed into this position adjacent to the manifold 12, the tolerances of various components of the adhesive melter 10 (including on the melter support frame 16 and on the pump pack assembly 18) may cause perpendicularity error that forms a small abutment gap 184 at the abutment between the pump support member 92 and the connection surface 50. This small abutment gap 184 is exaggerated in FIG. 8 and in the more detailed view of FIG. 8A to clarify what may be caused by the perpendicularity error (e.g., misalignment between the surfaces of the pump pack assembly 18 and the manifold 12 that are to be sealed together). For example, the total perpendicularity error may cause an angle of up to 0.5° to be formed between the pump pack assembly 18 and the manifold 12 in the exemplary embodiment.

Figure 9:
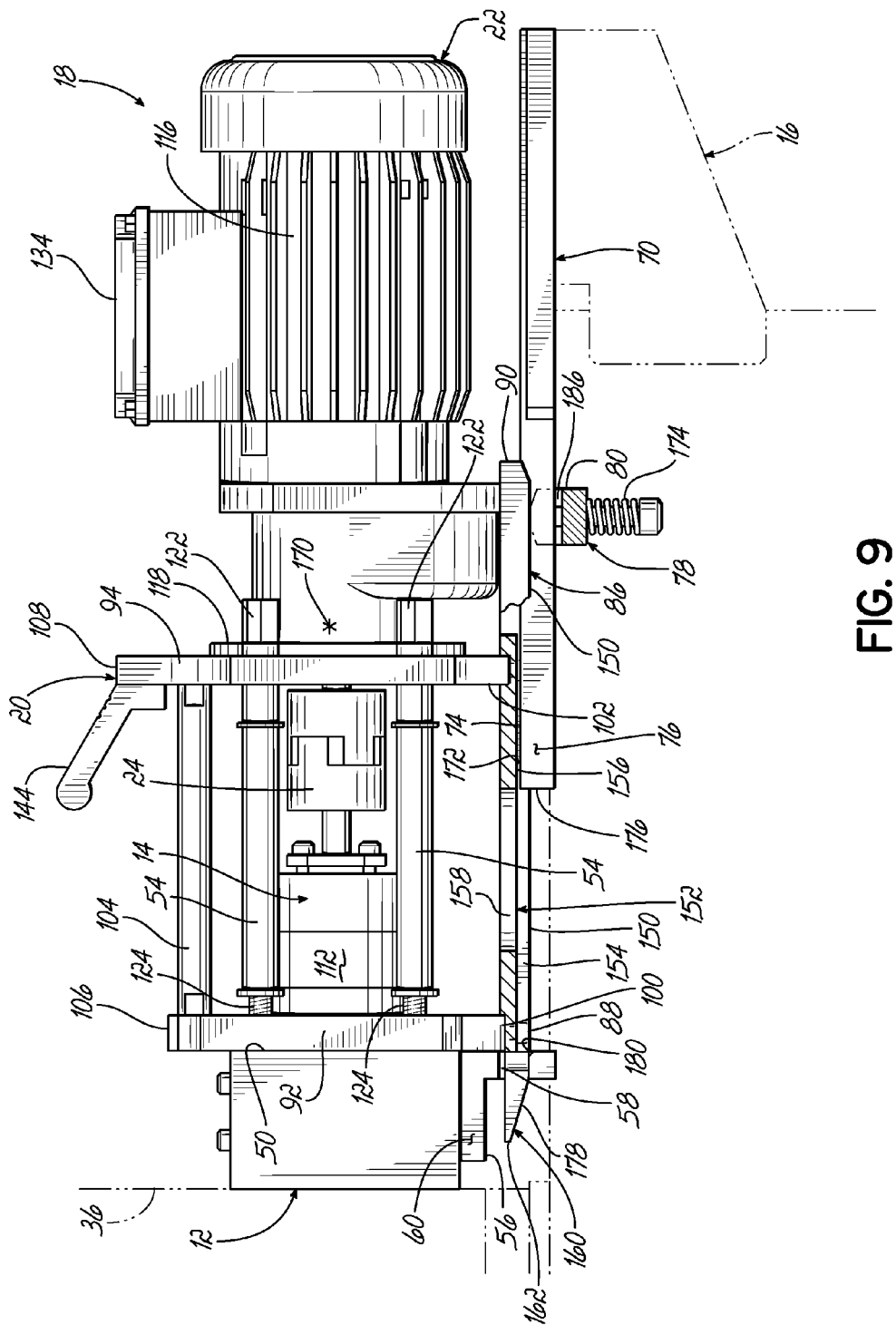
FIG. 9 is a side view of the adhesive melter and pump pack assembly of FIG. 8 during a fifth installation step in which coupling bolts on the pump pack assembly have been tightened into engagement with the manifold to bring the pump support member and manifold into flush engagement, the spring-loaded support compressing further as a result of this tightening motion.

To complete the mechanical connection of the pump pack assembly 18 and the manifold 12, the coupling bolts 54 are tightened into engagement with the threaded apertures 52 on the connection surface 50 as described briefly above. This tightening of the coupling bolts 54 forces the pump support member 92 into fluid-tight and flush engagement with the connection surface 50 and corrects for the perpendicularity error shown in FIG. 8 because the pump pack assembly 18 is free to tip or rotate slightly by compressing the spring 174 of the spring-loaded support 78 further downwardly, as shown in the fifth installation step shown in FIG. 9. The movement of the spring-loaded support 78 during tightening of the coupling bolts 54 also ensures that a substantial majority of a cantilever load that is defined by the weight of the pump pack assembly 18 is carried at the spring-loaded support 78 rather than rigidly at the guide rail 70 or at the coupling bolts 54. Carrying the cantilever load at a rigid support like the guide rail 70 would prevent the correction of perpendicularity error, and carrying the cantilever load at the coupling bolts 54 can cause binding of the threaded ends 124 and the threaded apertures 52, thereby requiring replacement of the pump pack assembly 18 and the manifold 12. In other words, the provision of the small gap 172 between the facing surface 156 of the guide track 152 and the guide rail 70, and another small gap 186 between the U-shaped support arm 80 and the guide rail 70 as shown in FIG. 9, avoids any rigid abutment or support of the pump pack assembly 18 away from the coupling bolts 54. Accordingly, the spring-loaded support 78 advantageously carries the load presented by the pump pack assembly 18 in a resilient and adjustable manner to avoid several problems that may otherwise be presented by keeping the pump 14 and the motor 22 on a shared rigid frame 20.

To remove the pump pack assembly 18 from the adhesive melter 10, the installation steps shown in FIGS. 5 through 9 are reversed so that the coupling bolts 54 are loosened and then the pump pack assembly 18 is slid rearward to free up the pump pack assembly 18 to be lifted off of the spring-loaded support 78. The entire process of removing a pump pack assembly 18 and replacing it with a backup or replacement pump pack assembly 18 can take less than five minutes, which eliminates substantially all downtime experienced by the adhesive melter 10 when the pump 14 or the motor 22 requires maintenance or replacement. To this end, the pump pack assembly 18 may be removed quickly and worked on in a separate shop while the backup pump pack assembly operates with the adhesive melter 10. Although not described during these series of steps in FIGS. 5 through 9, the electrical connection between the adhesive melter 10 and the pump pack assembly 18 is quickly made or removed at the quick change plug 138 and quick change receptacle 140. Consequently, the pump 14, motor 22, and drive coupling 24 are installed or removed as a unit quickly from the adhesive melter 10 and proper alignment and orientation of the pump 14 with the manifold 12 is assured by the quick change system and process described above. The mounting of the pump 14 and the motor 22 also enables the use of a simplified and inexpensive drive coupling 24, thereby further improving the operation of adhesive dispensing systems used with the adhesive melter 10. The pump pack assembly 18 improves the reliability and uptime of the adhesive melter 10.

While the present invention has been illustrated by a description of an exemplary embodiment, and while that embodiment has been described in considerable detail, there is no intention to restrict, or in any way limit, the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. An adhesive melter for use in an adhesive dispensing system, the melter comprising:
   a melter support frame including a spring-loaded support;
   a melter tank and a manifold positioned on said melter support frame, said manifold configured to receive molten adhesive from said melter tank; and
   a pump pack assembly comprising:
      a rigid frame including a base, a pump support member, a rear support member, and at least one fastener connected to said manifold, said pump support member and said rear support member being coupled to said base;
      a pump coupled to said pump support member for directing a flow of molten adhesive through said manifold;
      a motor coupled to said rear support member; and
      a drive coupling that operatively connects said pump to said motor, said pump pack assembly being collectively mounted as a unit on said melter support frame by positioning said rigid frame on said spring-loaded support, said pump support member being positioned in fluid-tight engagement with said manifold accommodating the flow of molten adhesive between said pump and said manifold, said spring-loaded support positioned to assist with resiliently carrying said pump pack assembly at said base as a cantilever load.

2. The adhesive melter of claim 1, wherein said rigid frame is arranged on said melter support frame to transfer a majority of the cantilever load to said spring-loaded support rather than said at least one fastener.

3. The adhesive melter of claim 1, wherein said pump pack assembly is mechanically secured to said melter support frame by only said at least one fastener so that said pump, motor, and drive coupling may be simultaneously removed by loosening said pump support member out of engagement with said manifold with said at least one fastener and lifting said rigid frame from said spring-loaded support.

4. The adhesive melter of claim 3, wherein said pump pack assembly further includes a combined power/control cord with a quick connect plug, and the melter further comprises:
   a quick connect receptacle and cord extending to a power source and/or controller for providing control commands and power to said motor and said pump.

5. The adhesive melter of claim 3, wherein said rear support member further comprises:
   a handle configured to be grasped by an operator to move said pump pack assembly as a unit into and out of engagement with said spring-loaded support and said manifold.

6. The adhesive melter of claim 1, wherein said pump support member and said rear support member each comprise a plate extending upwardly from said base, and said pump pack assembly further comprises:
   a tie rod spaced from said base and extending between said pump support member and said rear support member, said tie rod ensuring that said plates of said pump support member and said rear support member are aligned in generally parallel relation.

7. The adhesive melter of claim 1, wherein said at least one fastener includes a plurality of coupling bolts held captive on said rigid frame and extending between said pump support member and said rear support member.

8. The adhesive melter of claim 1, wherein said manifold further includes a pair of alignment slots, and said pump pack assembly further comprises:
   an alignment fork projecting forwardly from said base of said rigid frame, said alignment fork positioned to engage said pair of alignment slots to ensure accurate positioning when said pump support member is positioned in fluid-tight engagement with said manifold.

9. The adhesive melter of claim 1, wherein said melter support frame further includes a guide rail positioned adjacent to said spring-loaded support, and said pump pack assembly further comprises:
   a guide track formed in said base of said rigid frame, said guide track configured to receive said guide rail to accurately position said pump pack assembly relative to said manifold when said pump pack assembly is positioned on said spring-loaded support.

10. The adhesive melter of claim 9, wherein said spring-loaded support includes a U-shaped support arm projecting around said guide rail such that said pump pack assembly may be supported by said U-shaped support arm on either side of said guide track when said guide track receives said guide rail.

\* \* \* \* \*